US006336675B1

(12) United States Patent
Brückner

(10) Patent No.: US 6,336,675 B1
(45) Date of Patent: Jan. 8, 2002

(54) MULTIPART HOLLOW-BODY SUPPORTING ARM

(75) Inventor: Lothar Brückner, Leonberg (DE)

(73) Assignee: Edscha AG, Remscheid (DE)

( * ) Notice: Subject to any disclaimer, the term of this patent is extended or adjusted under 35 U.S.C. 154(b) by 0 days.

(21) Appl. No.: 09/606,648

(22) Filed: Jun. 29, 2000

(51) Int. Cl.[7] .............................. B62D 25/04; B60J 5/00

(52) U.S. Cl. ............................... 296/146.5; 296/146.11; 49/397; 16/382; 16/225; 16/DIG. 43

(58) Field of Search ........................... 296/146.11, 202, 296/146.5; 49/397; 160/210, 213; 16/382, DIG. 43, 225

(56) References Cited

U.S. PATENT DOCUMENTS

| | | | | | |
|---|---|---|---|---|---|
| 3,871,283 | A | * | 3/1975 | John | 16/382 |
| 4,807,331 | A | * | 2/1989 | Calucci | 16/382 |
| 4,827,568 | A | * | 5/1989 | Ramsauer | 16/382 |
| 4,881,296 | A | * | 11/1989 | Marinoni | 16/382 |
| 4,937,916 | A | * | 7/1990 | Redman | 16/382 |
| 5,029,364 | A | * | 7/1991 | Salazar | 16/382 |
| 5,133,108 | A | * | 7/1992 | Esnault | 16/225 |
| 5,195,214 | A | * | 3/1993 | Lautenschlager et al. | 16/382 |
| 5,448,799 | A | * | 9/1995 | Stein | 16/225 |
| 5,481,782 | A | * | 1/1996 | Grabher | 16/DIG. 43 |
| 5,809,617 | A | * | 9/1998 | Harris et al. | 49/397 |
| 6,000,747 | A | * | 12/1999 | Sehgal et al. | 296/146.11 |
| 6,052,870 | A | * | 4/2000 | Hagenlocher et al. | 296/146.11 |

FOREIGN PATENT DOCUMENTS

| | | | | |
|---|---|---|---|---|
| DE | 34 23 037 | * | 1/1986 | 16/225 |
| DE | 36 20 004 | * | 12/1987 | 16/382 |
| DE | 37 34 369 | * | 4/1989 | 196/202 |
| DE | 29603490 U1 | | 6/1996 | |
| EP | 0 237 789 | * | 2/1987 | 16/382 |

* cited by examiner

*Primary Examiner*—Joseph D. Pape
*Assistant Examiner*—Kiran B. Patel

(57) ABSTRACT

A hollow-body supporting arm of a swing-out hinge for a door of a motor vehicle, in which the door- and pillar-side coupling pins (5) are arranged at the free ends of the supporting arm (1). The supporting arm has two pairs of single reverse-action joints (4). In the supporting arm, the regions of the hinge pins between the single reverse-action joints, which are arranged one above the other, are left open. The supporting arm (1) is divided in such a manner that in addition to a base supporting arm (2) at least one end region having the single reverse-action joints (4) arranged on it is formed as a separate supporting-arm part (3). The mutually facing end sides of the base supporting arm (2) and of the supporting-arm parts (3) are formed in such a manner that they can be connected securely and captively to one another and when connected form a highly rigid supporting arm.

18 Claims, 2 Drawing Sheets

MULTIPART HOLLOW-BODY SUPPORTING ARM

BACKGROUND OF THE INVENTION

1. Field of the Invention

The present invention relates to a hollow-body supporting arm of a swing-out hinge for a door of a motor vehicle, in which the door- and pillar-side coupling pins are arranged at the free ends of the supporting arm with two pairs of single reverse-action joints and in which the region of the hinge pins between the single reverse-action joints, which are arranged one above another, is left open. The present invention also relates to a hollow-body door body shell of a motor vehicle door, in which the pillar-side coupling pin is arranged at the free end of the door body shell with a pair of single reverse-action joints and in which the region of the hinge pins between the single reverse-action joints, which are arranged one above another, is left open.

2. Background Information

Supporting arms or intermediate links are frequently used in swing-out hinges in order to be able to span relatively large distances between the coupling points. In particular in the case of swing-out hinges and the coupling of relatively heavy doors, the supporting arms are stressed by large shearing or bending moments which may also be combined with torsional moments. It is therefore necessary to design the supporting arms to be rigid and fixed against torsion, it being very important at the same time to construct the supporting arms to be as lightweight as possible.

For these reasons, the supporting arms are frequently designed as hollow bodies. They can be produced by using hollow profiles to construct the supporting arms or by the connection of deep-drawn sheet-metal profiles. When extrudable materials are used, extruded hollow profiles are also used to construct the supporting arms. When these extruded hollow profiles are used, the profiles are often constructed in such a manner that they have a plurality of essentially vertically extending chambers which are arranged next to one another. This design is well-suited for the extrusion of light-metal profiles. However, the end regions of the supporting arms, on which the single reverse-action joints/gudgeons are arranged, cause difficulties. Hollow spaces which do not lie parallel to the extrusion direction are frequently required in these end regions. In addition, very complicated mechanical and metal-cutting refinishing is required in these regions. Since, for static and kinetic reasons, the single reverse-action joints/gudgeons are frequently arranged in the region of the outermost corners of the supporting arm, parts of material between the single reverse-action joints arranged one above another in the region of the hinge pins are removed in order to be able to attach the corresponding hinge parts over the hinge lugs.

A similar situation is also produced if a door is coupled by the door body shell to the door pillar by means of simple, conventional hinges. The body of the door body shell is frequently produced from hollow profiles, in particular also from light-metal extruded profiles. Here too during the extrusion of the hollow profiles difficulties arise in the end regions of the door body shell parts on which the single reverse-action joints/gudgeons are arranged.

In the prior art, german Patent Document No. 296 03 490 discloses a body structure in which a hinge part attached to a door is a profile which extends along an edge of the door and is securely connected to a wing profile by means of a snap connection. This has as latching elements a hook, a latching lug and a holding butt strap running in the region of a recess, the latching elements being able to be brought into positive-locking engagement with corresponding latching elements of a door profile, forming a snap connection. Since the parts are connected to one another by means of a snap connection, the part to be formed in this way is not a rigid component.

SUMMARY OF THE INVENTION

The present invention provides a hollow-body supporting arm of a swing-out hinge for a door of a motor vehicle, in which the door and pillar-side coupling pins (5) are arranged at the free ends of the supporting arm (1) with two pairs of single reverse-action joints (4) and in which the regions of the hinge pins (5) between the single reverse-action joints, which are arranged one above another, are left open. The supporting arm (1) is divided in such a manner that in addition to a supporting-arm base (2) at least one end region having the single reverse-action joints (4) arranged on it is formed as a separate supporting-arm part (3), and the mutually facing end sides of the supporting-arm base (2) and of the supporting-arm parts (3) are formed in such a manner that they can be connected securely and captively to one another and when connected form a highly rigid supporting arm.

The technical problem on which the invention is based consists in indicating a design for the supporting arm or door body shell, which design offers favorable conditions for the production thereof and at the same time satisfies the requirements regarding strength, rigidity and saving on weight. This problem is solved through the design of the hollow-body supporting arm or door body shell with the supporting arm or the door body shell being divided in such a manner that in addition to a base supporting arm or the base door body shell at least one end region having the single reverse-action joints arranged on it is formed as a separate supporting-arm part or door body shell part. The mutually facing end sides of the base supporting arm and of the supporting-arm parts or of the base door body shell and the door body shell parts are formed in such a manner that they can be connected securely and captively to one another and when connected form a highly rigid supporting arm or door body shell.

A supporting arm or door body shell of this type has the advantage that the base supporting arm or the base door body shell is very well suited for production by extrusion. The separate supporting-arm parts or door body shell parts can be produced using the processes suitable in each case and from the materials suitable for the stress on them. Since the parts here are of a relatively small size and are lightweight, they provide good conditions for the production and the mechanical machining. Parts which are highly stressed mechanically can be produced from materials meeting these requirements. It is particularly advantageous that the end sides, which face one another when assembled, of the base supporting arm and the supporting-arm parts or of the base door body shell and the door body shell parts are formed in such a manner that they are suitable for a fixed and captive connection.

In one embodiment, in which the sides which face one another when connected have positive-locking profiles coordinated with one another, the condition is advantageously provided to make a particularly secure connection possible. With an appropriate design of the positive-locking profiles, conditions can therefore also be provided for the parts to be connected to one another by cold pressure welding. If the base supporting arm is connected to the supporting-arm part or if the base door body shell is connected to the door body shell part by connecting techniques such as welding, soldering or bonding to one another, the positive-locking profiles can make it possible, in conjunction with the connecting techniques, for force-locking or force- and positive-locking connections to be produced. This makes it possible in a simple manner to produce a connection between the parts sufficient for all instantaneous loads occurring on the supporting arm or on the door body shell, and at the same time to construct it in an extremely weight-saving manner.

The present invention also provides a hollow-body door body shell of a motor vehicle door, in which the pillar-side coupling pin is arranged at the free end of the door body shell with a pair of single reverse-action joints and in which the region of the hinge pins between the single reverse-action joints, which are arranged one above another, is left open. The door body shell is divided in such a manner that in addition to the door body shell base at least the pillar-side single reverse-action joints are arranged on a separate door body shell part, and the mutually facing sides of the door body shell base and of the door body shell part are formed in such a manner that they are securely and captively connected to one another and when connected form a highly rigid door body shell.

BRIEF DESCRIPTION OF THE DRAWINGS

The above-mentioned and further advantages are explained clearly by the description of an exemplary embodiment, which is only illustrated in terms of the supporting arm in the attached drawings, in which.

DETAILED DESCRIPTION OF THE PREFERRED EMBODIMENT

Figure 1:
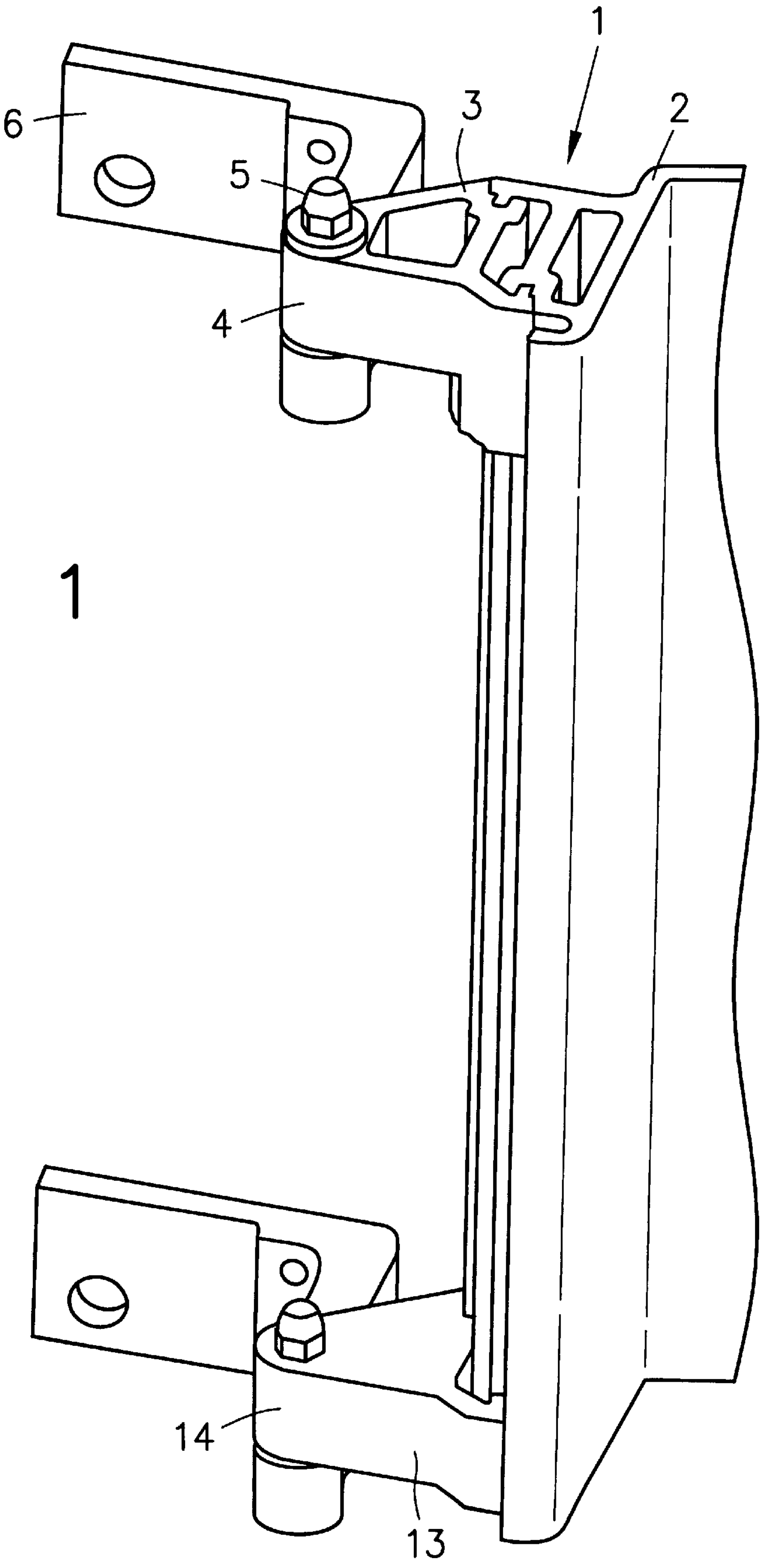
FIG. 1 shows an end region of a base supporting arm and a supporting-arm part fastened thereto with single reverse-action joints/gudgeons arranged thereon.

FIG. 1 shows a supporting arm 1 having a supporting-arm base 2 and supporting-arm parts 3, 13. In FIG. 1, on the right-hand side, an end region of supporting-arm base 2 is illustrated, with the predominant part of supporting-arm base 2 extending in the direction of the rupture line on the right in FIG. 1. Supporting-arm parts 3, 13, which are arranged on the lefthand side of supporting arm 1, each have a positive-locking profile which is coordinated with a profile on the end side of the supporting-arm base 2. In the exemplary embodiment, the supporting-arm parts 3, 13 are only negligibly higher than the single reverse-action joints 4 integrated therein. Coupled to the gudgeon 4, which includes a pin 5, is a hinge part 6 which enables the hinge to be fastened to one of the door arrangement parts, the door or door pillar.

The positive-locking profiles at the end sides of the supporting-arm base 2 and the supporting-arm parts 3 are designed in such a manner that when pushed together (e.g., by part 3 being slid axially over base 2) they produce the friction required for carrying out a cold pressure welding process. If required, at the points at which the two positive-locking profiles abut against each other, additional connecting techniques, such as welding or soldering, can be used. It can clearly be seen that a substantial reduction in weight is possible by leaving open the entire region between the two single reverse-action joints 4, 14. It is also clearly illustrated that the supporting-arm parts 3, 13 can be produced in an advantageous manner and can be handled in a simple manner for mechanical machining.

In the exemplary embodiment illustrated, there is no material connection between the upper and lower single reverse-action joints 4, 14 on the supporting-arm parts 3, 13. In other designs, said joints can be connected by relatively small profiled webs.

Figure 2:
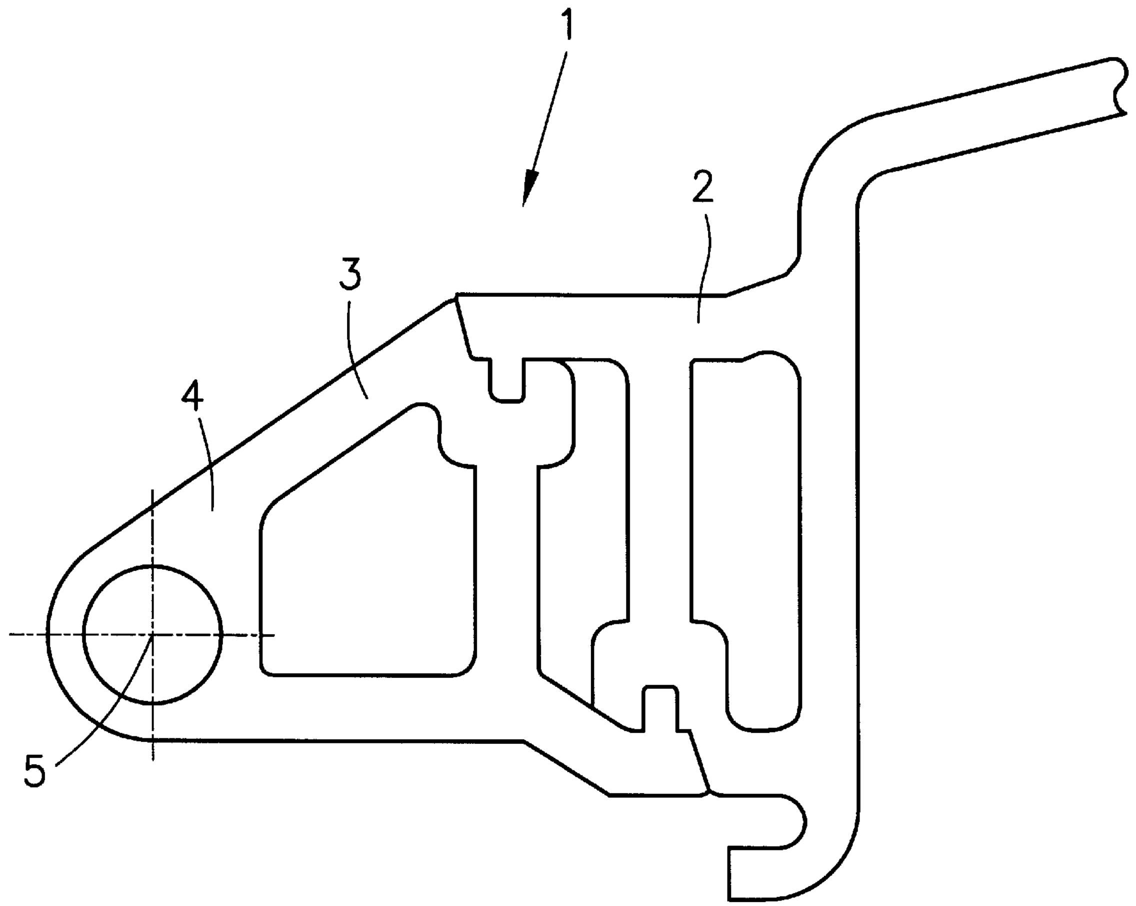
FIG. 2 shows the positive-locking profiles, which are coordinated with one another, on the end sides of the base supporting arm and supporting-arm part.

In FIG. 2, the positive-locking profiles which are plugged together and are formed on the end sides of the supporting-arm base 2 and the supporting-arm part 3, are illustrated again on an enlarged scale. The main part of the supporting-arm base 2 is connected on the right-hand side of the illustration, and may be integral for example with a vehicle body. In the exemplary embodiment illustrated, the gudgeon arranged in the single reverse-action joint 4 can be produced directly with the joint as the latter is being produced or can be produced in a very simple manner by subsequent mechanical machining. The coupling/hinge pin 5 extends here parallel to the extrusion direction for the base supporting arm 2 and supporting-arm part 3.

While the embodiment shown in FIGS. 1 and 2 has been described as a supporting arm connected to a vehicle body with hinges 6 connected to the door of the vehicle, the present invention also encompasses the case where the supporting-arm base 2 is a door body shell base connected to the door and the hinge 6 is connected to the vehicle body. The embodiment which relates in the description of the figures to the supporting arm thus also apply in an identical manner to a correspondingly designed system comprising a door body shell base and door body shell part.

List of Reference Numbers

1 Supporting arm
2 Supporting-arm base
3 Supporting-arm part
4 Single reverse-action joint/gudgeon
5 Coupling/hinge pin
6 Hinge part
13 Supporting-arm part
14 Single reverse action joint/gudgeon

What is claimed is:

1. A hollow-body supporting arm of a swing-out hinge for a door of a motor vehicle, with door and pillar-side coupling pins arranged at free ends of the supporting arm with two pairs of single reverse-action joints, regions of the pins between the single reverse-action joints being left open and the joints being arranged one above another, the supporting arm comprising:

a supporting-arm base having at least one end region with a base end side; and supporting-arm parts having connecting end sides for connecting to the base end side so that the connecting end sides and the base end side connect the supporting-arm parts and the supporting arm base securely and captively to one another so as to form a rigid supporting arm.

2. The supporting arm as claimed in claim 1 wherein the supporting-arm parts are integral with the single reverse-action joints and at least one of the supporting arm parts includes a light-metal extruded profile.

3. The supporting arm as claimed in claim 1 wherein the base end side and the connecting end sides have positive-locking profiles coordinated with one another.

4. The supporting arm as claimed in claim 1 wherein the supporting-arm parts are connected in a force-locking manner to the supporting-arm base by a connecting technique including at least one of welding, soldering and bonding.

5. The supporting arm as claimed in claim 1 wherein the supporting-arm parts are connected in a force- and positive-locking manner to the supporting-arm base by a connecting technique including at least one of welding, soldering and bonding.

6. The supporting arm as claimed in claim 1 wherein the supporting-arm parts and the supporting-arm base are connected by a connecting technique including at least one of cold pressure welding and pressure welding.

7. The supporting arm as claimed in claim 4 wherein the supporting-arm parts and the supporting-arm base are connected by a connecting technique including at least one of cold pressure welding and pressure welding.

8. The supporting arm as claimed in claim 5 wherein the supporting-arm parts and the supporting-arm base are connected by a connecting technique including at least one of cold pressure welding and pressure welding.

9. A hollow-body door body shell of a motor vehicle door, with a pillar-side coupling pin is arranged at a free end of the door body shell with a pair of single reverse-action joints, a region of the hinge pins between the single reverse-action joints, which are arranged one above another, being left open, the body shell comprising:

a door body shell base having a base end side; and a door body shell part, at least a pillar-side single reverse-action joint being arranged on the door body shell part, the door body shell part having a connecting end side connected to the base end side so that the door body shell base and the door body shell part are securely and captively connected to one another so as to form a rigid door body shell.

10. The door body shell as claimed in claim 9 wherein the base end side and the connecting end side have positive-locking profiles coordinated with one another.

11. The door body shell as claimed in claim 10 wherein the door body shell part is connected in a force-locking manner to the door body shell base by a connecting technique including at least one of welding, soldering and bonding.

12. The door body shell as claimed in claim 10 wherein the door body shell part is connected in a force-locking and positive-locking manner to the door body shell base by a connecting technique including at least one of welding, soldering and bonding.

13. The door body shell as claimed in claim 10 wherein the door body shell part is connected to the door body shell base by a connecting technique including at least one of cold pressure welding and pressure welding.

14. The door body shell as claimed in claim 11 wherein the door body shell part is connected to the door body shell base by a connecting technique including at least one of cold pressure welding and pressure welding.

15. The door body shell as claimed in claim 12 wherein the door body shell part is connected to the door body shell base by a connecting technique including at least one of cold pressure welding and pressure welding.

16. A method for forming a hollow-body supporting arm of a swing-out hinge for a door of a motor vehicle comprising the steps of:

connecting a connecting end side of a first supporting-arm part to a free end of a supporting-arm base so as to be fixedly and rigidly connected, the first supporting arm part supporting a first reverse-action joint; and connecting a second connecting end side of a second supporting-arm part to a second free end of the supporting-arm base so as to be fixedly and rigidly connected, the second supporting arm part supporting a second reverse-action joint separated from the first reverse-action joint by a left-open region.

17. The method as claimed in claim 16 wherein the supporting arm is fixedly connected to a vehicle body.

18. The method as claimed in claim 16 wherein the supporting arm is fixedly connected to a vehicle door.

* * * * *